A. H. HIEATZMAN.
COMPUTING SCALE.
APPLICATION FILED DEC. 31, 1920.

1,426,477.

Patented Aug. 22, 1922.
2 SHEETS—SHEET 1.

WITNESSES

INVENTOR.
Arthur Howard Hieatzman
BY
ATTORNEY.

A. H. HIEATZMAN.
COMPUTING SCALE.
APPLICATION FILED DEC. 31, 1920.
1,426,477.
Patented Aug. 22, 1922.
2 SHEETS—SHEET 2.
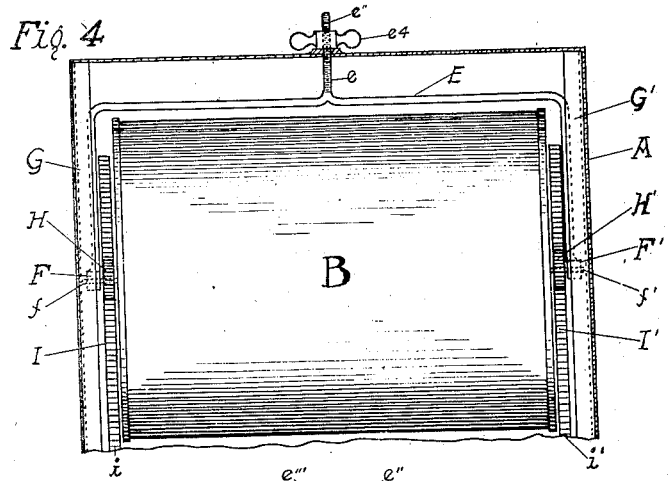
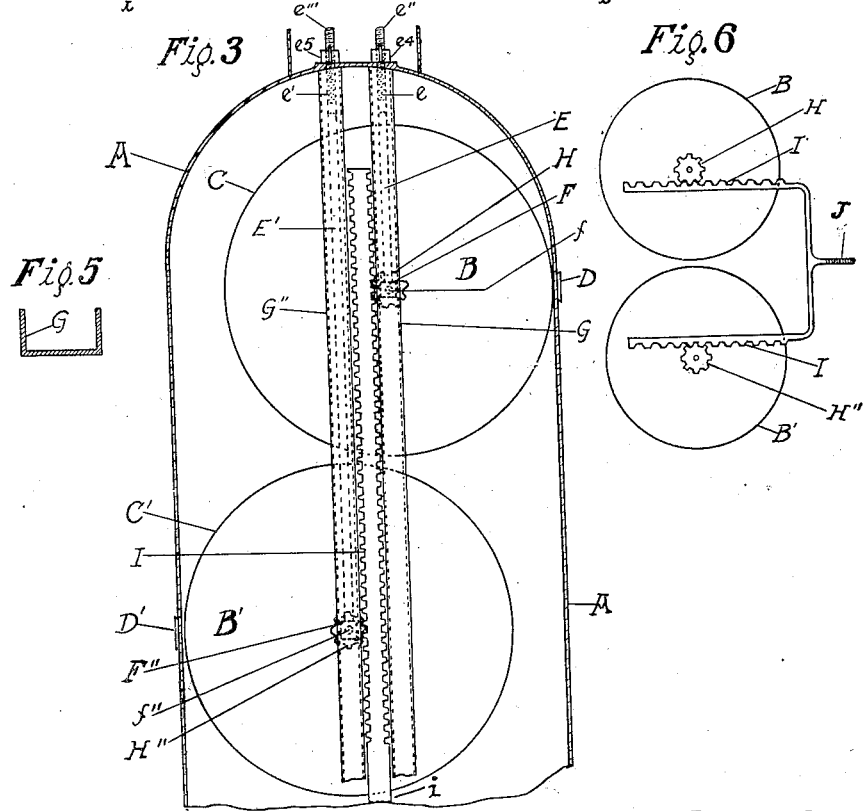
WITNESSES
INVENTOR.
Arthur Howard Hieatzman
BY
ATTORNEY.

UNITED STATES PATENT OFFICE.

ARTHUR HOWARD HIEATZMAN, OF BALTIMORE, MARYLAND.

COMPUTING SCALE.

1,426,477. Specification of Letters Patent. Patented Aug. 22, 1922.

Application filed December 31, 1920. Serial No. 434,302.

*To all whom it may concern:*

Be it known that I, ARTHUR HOWARD HIEATZMAN, a citizen of the United States, residing at Baltimore city and State of Maryland, have invented certain new and useful Improvements in Computing Scales, of which the following is a specification.

My invention is in the nature of an improvement upon the type of scales which automatically compute and indicate both the weight of the merchandise that may be placed on the weighing-platform and the amount to be charged therefor, my improvement being a means whereby both the weight and computation of the amount is made visible to the vendor and vendee simultaneously, preferably in like manner and form on opposite sides of the scale. To obtain this object I employ two cylinders each registering a like mode of chart in duplicate one for each opposite side of the scale. These duplicate chart cylinders I arrange to revolve in reverse direction having them functioned by opposite sides of the same element, they thereby present simultaneously the weight and correctly computed price to the vendor and vendee alike.

In the present construction of the computing scale where the weight is displayed simultaneously to the vendee and the vendor on opposite sides of the scale, the movement of the said display on the side of the vendee is made in a reverse direction. Since the movement on the side of the vendee is backwards and not in direction with customary display movements, it causes much embarrassment, perplexity and confusion and is often given a wrong reading instead of the one properly indicated, especially so in ounces fractional of the pound just beyond each pounds numeral; for a concrete example, 17 ounces reading in customary direction is only 15 ounces, the eye has to take in too wide a scope. Customary display movements as is well known are from down to up and from left to right.

With my construction the movement on each side is in the customary direction and thus overcomes this unsatisfactory feature.

Figure 1:
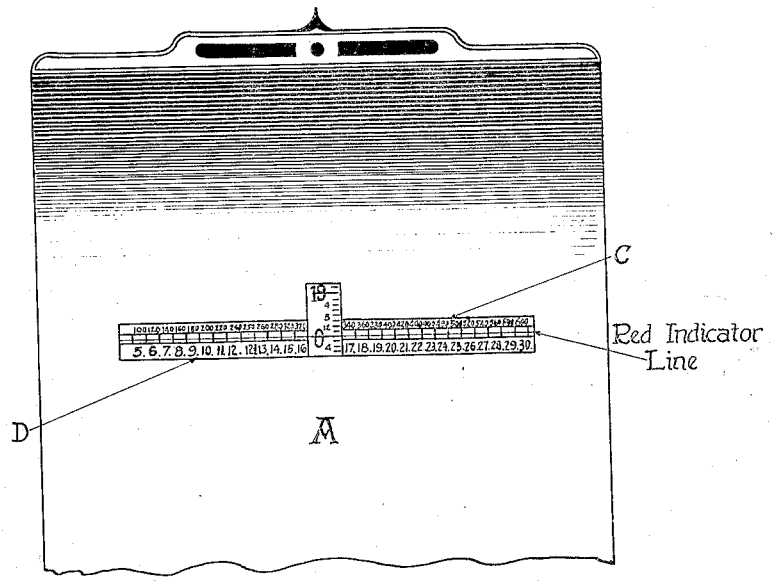
Figure 2:
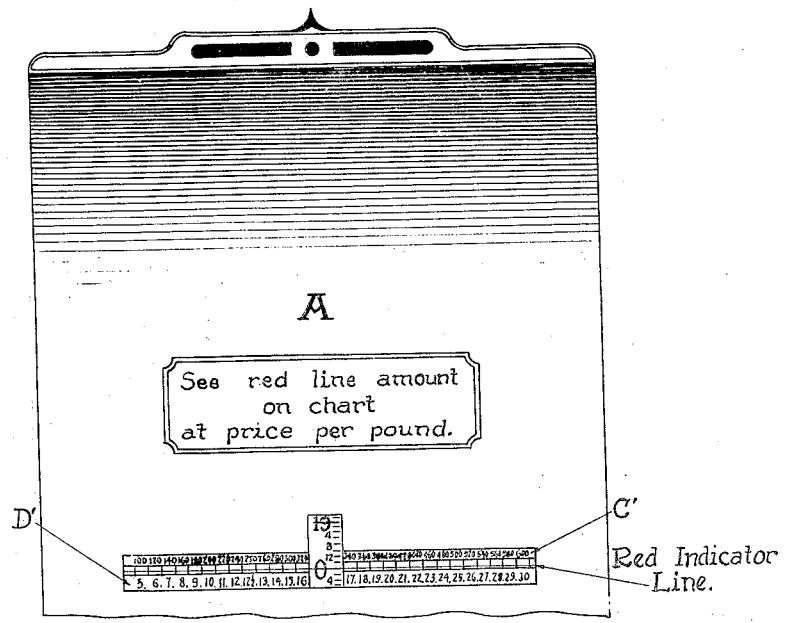

Referring to the accompanying drawings which form a part of this specification, Fig. 1 is a view in elevation of the upper part of the scale on the side next to the vendor, Fig. 2 is a view in elevation of the upper part of the scale on the side next to the vendee, Fig. 3 is an inside view of the upper part of the scale in elevation with the left hand end removed thereby showing the main features of my invention. Fig. 4 is a detail view of the upper cylinder B with actuating parts, Fig. 5 is a cross section view of the U shaped channels and Fig. 6 is a view showing a modification in the manner of actuating the cylinders with the same results of revoluble movements as that shown in Fig. 3.

Illustrated by and in explaining the drawings: Within a suitable enclosing case A I arrange two cylinders B and B' to revolve in reverse direction one to the other, around the periphery of each cylinder and integral therewith is a computing chart C and C' respectively, of like computations as a means for registering and displaying simultaneously on opposite sides of the scale the weight and the correct computed cost of the article weighed. A transparently covered opening D in the case A with a red line indicator running parallel with the said opening on the said transparent covering, and a transparently covered opening D' in the opposite side of the case A with a red line indicator running parallel with this opening on this transparent covering permits observation of the indicated amount of weight and computation by the vendor and vendee simultaneously.

To cause both cylinders to revolve in opposite directions I employ the following mechanism, U shaped hangers E and E' for suspending the cylinders B and B', the former each with a stem $e$ and $e'$ with threaded ends $e''$ and $e'''$ extending up through the top of the case A to engage the wing-nuts $e^4$ and $e^5$. At each lower end of each arm of each hanger I provide a journal box F F' F'' and F''' (not shown) in which the pivots of the cylinders B and B' turn. U shape channel bars G G' (not shown) G'' and G''' are provided at each end side of the case A as a means for holding the journal boxes F F' F'' F''' and keeping the cylinders B and B' in place, they also permit at the same time the up and down movements of the hangers E and E' when the wing nuts $e^4$ and $e^5$ are being screwed up or unscrewed. Fastened on the pivots $f$ $f'$ $f''$ and $f'''$ (not shown) of the cylinders B and B' in proper location are pinion wheels H H' H'' and H''', rack bars I and I' toothed on reverse sides to engage the pinions of the wheels H H' H'' and H''' the said rack bars I and I' at their lower ends, $i$ and $i'$ are properly connected with a downward movement for registering to the weighing levers of the scale, the latter being actuated by the article placed on the weighing platform of the scale. As my invention has no bearing on the weighing mechanism proper of the scale, but only on the registering parts, the former is omitted from the drawings.

If desired both cylinders B and B' can be arranged to operate on the same plane of elevation such as that shown in Fig. 6 of the drawings, the rack bars shown therein being joined together in U shape formation with a stem J in the lower connection, all properly connected as above specified; or, they can be arranged to operate in reversed elevations to that shown in Fig. 3 of the drawings, the rear or outer cylinder B' towards the vendee can have the greater altitude; these changes are immaterial and can be made without departing from the scope of the invention.

For the re-adjustment of cylinder B, should it at any time need re-adjusting from any cause whatever after the cylinders have been properly set up, to make the zero point on its chart accurate with its red line indicator nuts $e^4$ and $e^5$ are provided. If said red line be below the latter tightening up the wind nut $e^4$ on the stem $e$, the rack bar I being stationary, will cause the cylinder B to revolve a minute portion and bring the zero point up into a correct position with its indicator; should the zero point be slightly above its indicator a loosening up of the wing nut $e^4$ will allow the cylinder to lower and turn minutely in a reverse direction and produce a like result in lowering the zero point into a correct position. The same manner of action with cylinder B' will accomplish the same results. A change of a tooth of its rack bars in their engagement with its pinion wheels may be necessary should the distance for re-adjustment of a cylinder be beyond the scope of the above described controls.

What I claim is:

1. In a registering device for computing scales, a case having transparently covered longitudinal openings, one on each side, a set indicator along each of the said openings, two revoluble cylinders within the said case each of the said cylinders having journal boxes mounted permitting up and down movement with means for preventing lateral displacement.

2. In a registering device for computing scales, a case having transparently covered longitudinal openings, one on each side, a set indicator along each of the said openings, two revoluble cylinders within the said case, means for simultaneously operating the two cylinders and means independent of the operating element for adjusting each of the said cylinders with its indicator.

3. In a registering device for computing scales, a case having transparently covered longitudinal openings, one on each side, two revoluble cylinders within the said case journaled in boxes mounted to permit an up and down movement with means to prevent lateral displacement, a set indicator along each of the said transparently covered longitudinal openings for the purpose of indicating the computed product displayed on each cylinder.

4. In a registering device for computing scales, a case having transparently covered longitudinal openings, one on each side, two revoluble cylinders within the said case bearing duplicate indicator charts around their peripheries and journaled in boxes mounted to permit an up and down movement, with means to prevent lateral displacement, an indicator along each of the said transparently covered openings for indicating the register on each cylinder and means for connection with the weighing platform to operate the said cylinders and cause them to register simultaneously, each with its indicator on opposite sides of the case, the correct computed product of the article weighed at its price per pound.

ARTHUR HOWARD HIEATZMAN.

Witnesses:
C. MARCELLUS DORSEY,
IRVIN F. DORSEY.